No. 772,635. PATENTED OCT. 18, 1904.
O. STALEY.
CEMENT BRICK MAKING MACHINE.
APPLICATION FILED OCT. 12, 1903.
NO MODEL. 6 SHEETS—SHEET 1.

Witnesses
Frank A. Fahle
J. A. Walsh

Inventor
Ora Staley
By
Bradford & Hood
Attorneys

No. 772,635. PATENTED OCT. 18, 1904.
O. STALEY.
CEMENT BRICK MAKING MACHINE.
APPLICATION FILED OCT. 12, 1903.
NO MODEL. 6 SHEETS—SHEET 3.

Witnesses
Frank A. Fohle
J. A. Walsh

Inventor
Ora Staley
By
Bradford & Hood
Attorneys

No. 772,635. PATENTED OCT. 18, 1904.
O. STALEY.
CEMENT BRICK MAKING MACHINE.
APPLICATION FILED OCT. 12, 1903.
NO MODEL. 6 SHEETS—SHEET 4.

Witnesses
Frank A. Fahle
J. A. Walsh

Inventor
Ora Staley
By
Bradford & Hood
Attorneys

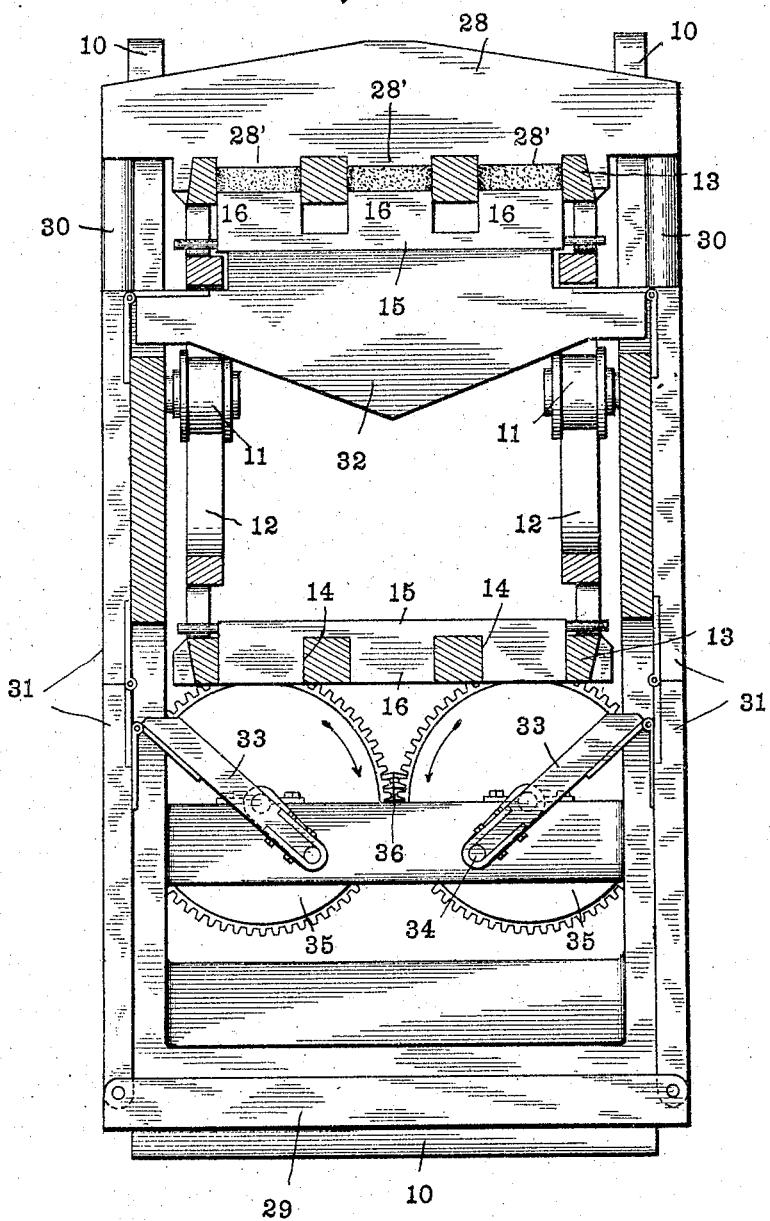

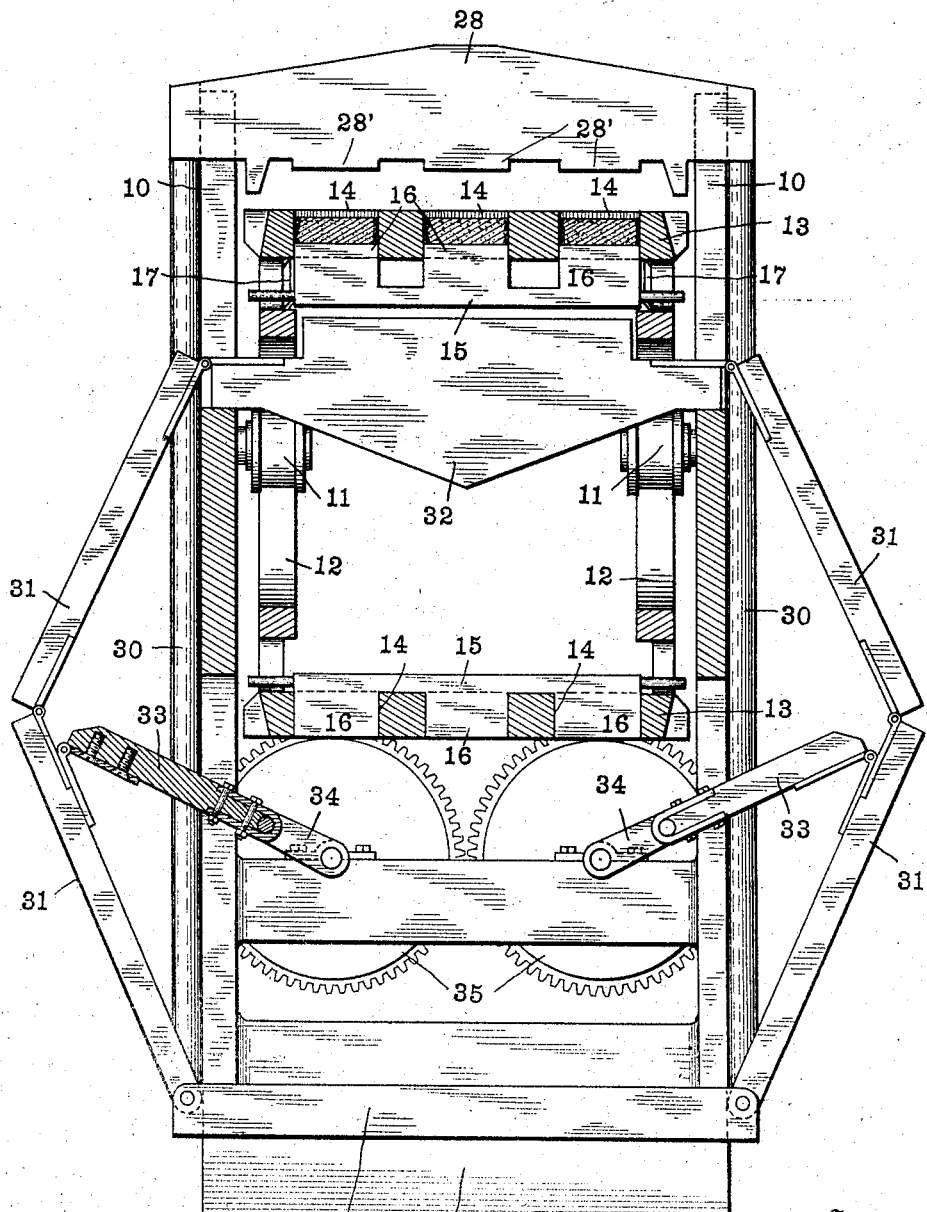

No. 772,635. Patented October 18, 1904.

UNITED STATES PATENT OFFICE.

ORA STALEY, OF CHARLOTTESVILLE, INDIANA.

CEMENT-BRICK-MAKING MACHINE.

SPECIFICATION forming part of Letters Patent No. 772,635, dated October 18, 1904.

Application filed October 12, 1903. Serial No. 176,759. (No model.)

*To all whom it may concern:*

Be it known that I, ORA STALEY, a citizen of the United States, residing at Charlottesville, in the county of Hancock and State of Indiana, have invented certain new and useful Improvements in Cement-Brick-Making Machines, of which the following is a specification.

The object of my invention is to produce an efficient machine for the manufacture of cement bricks, particularly of that type manufactured in accordance with the method described and claimed in the pending application of myself and John A. Johnson, Serial No. 175,307.

The accompanying drawings illustrate my invention.

Figure 1:
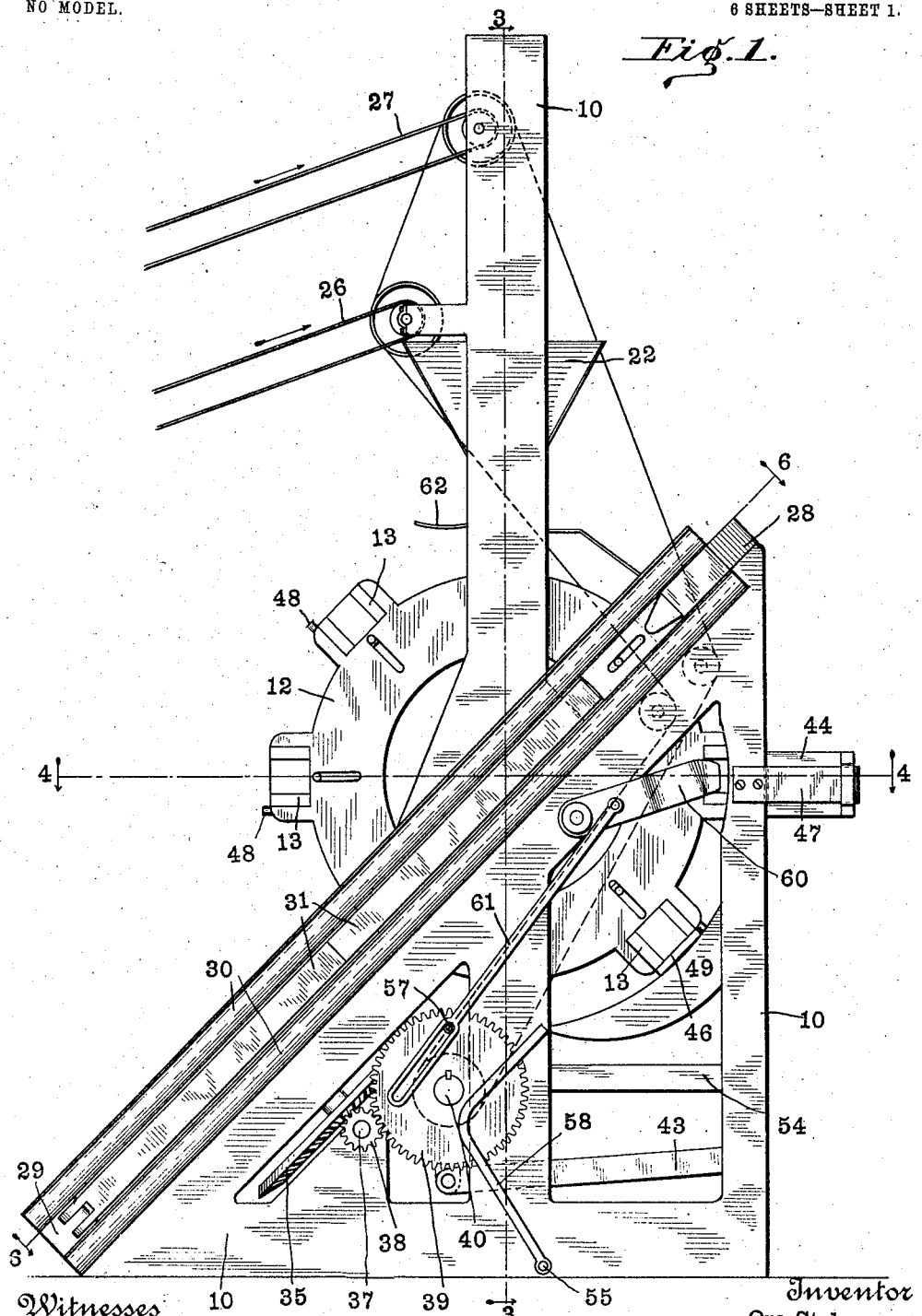
Figure 2:
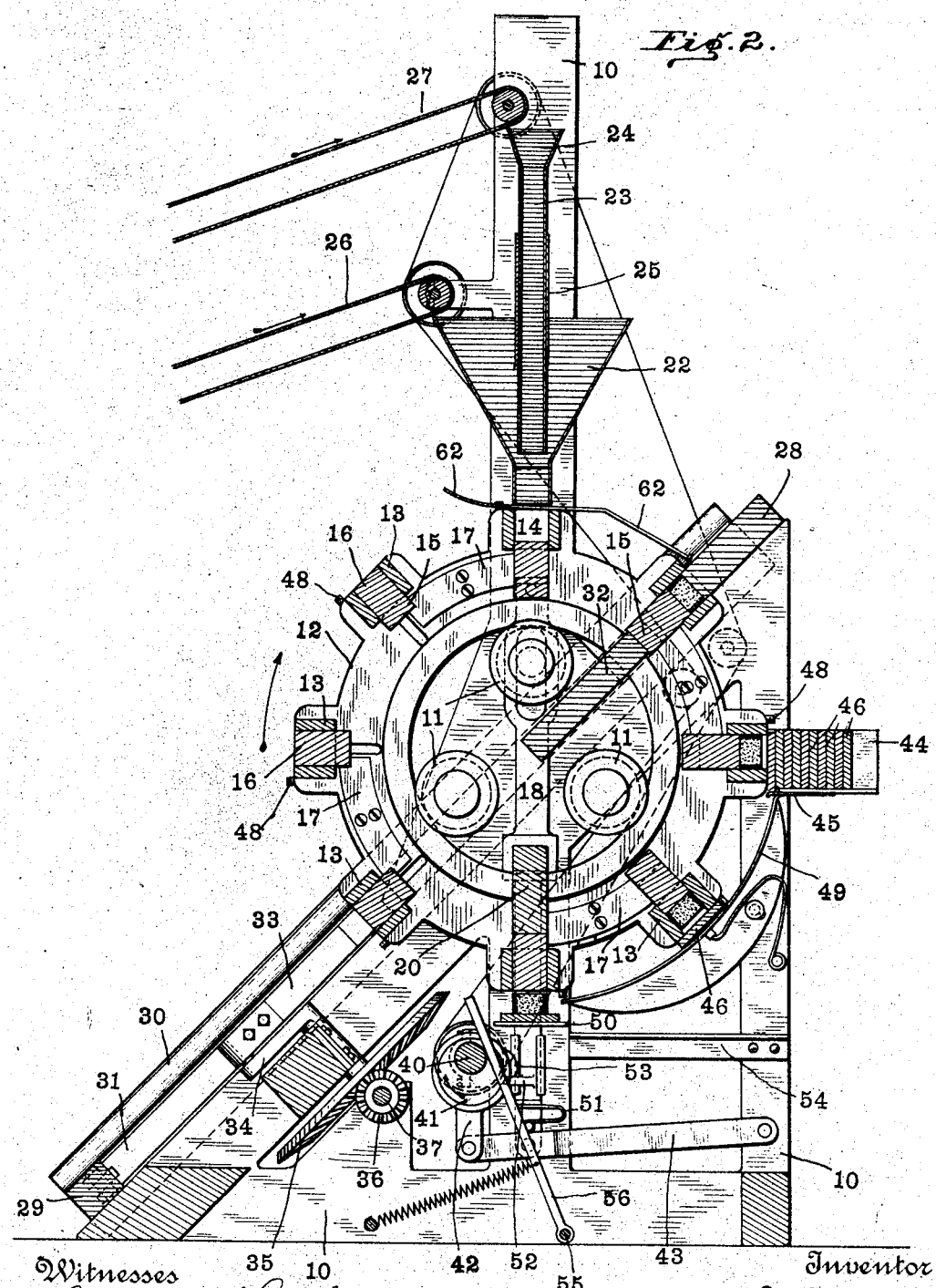
Figure 3:
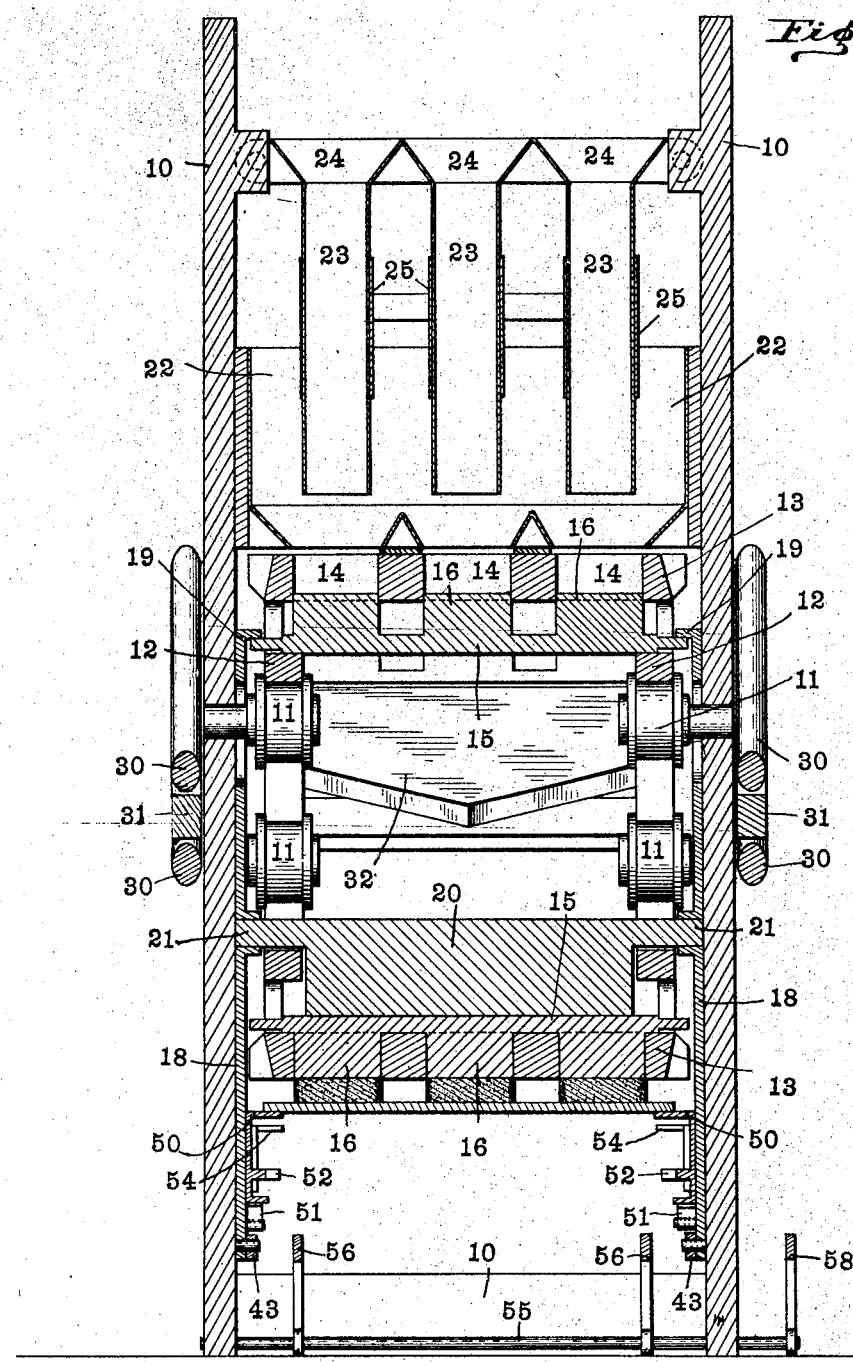
Figure 4:
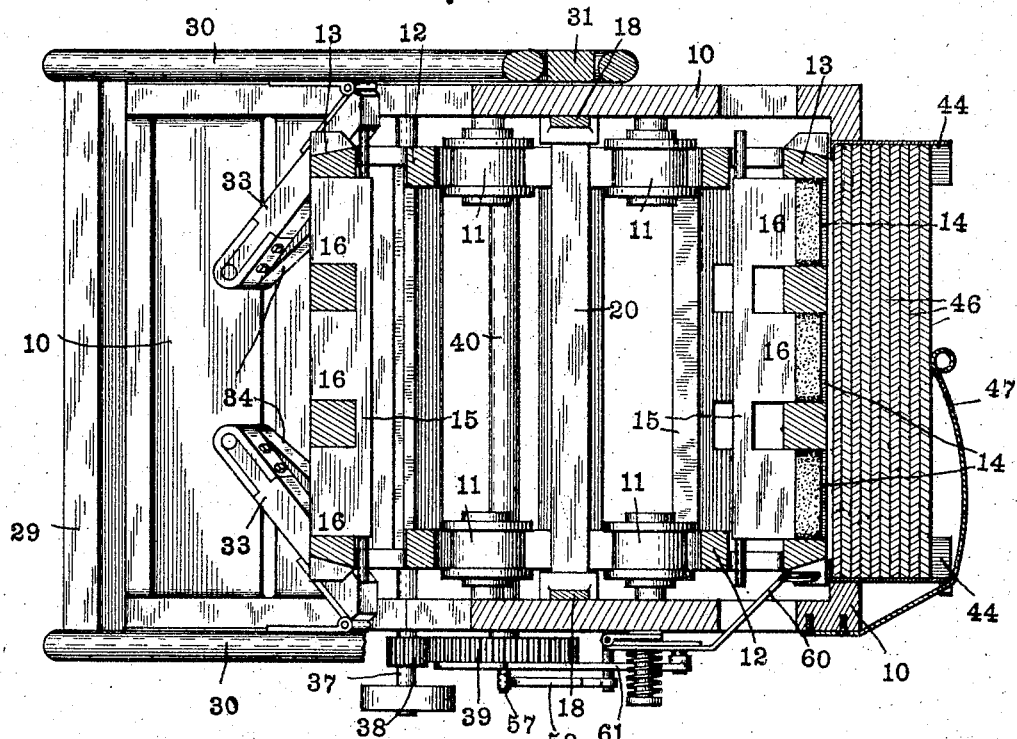
Figure 5:
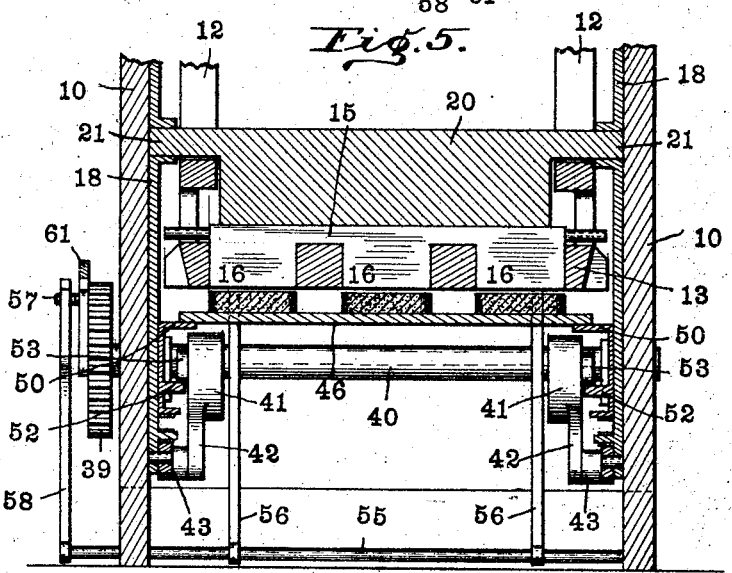

Figure 1 is a side elevation; Fig. 2, a central vertical section parallel with Fig. 1; Fig. 3, a section on line 3 3 of Fig. 1; Fig. 4, a horizontal section on line 4 4 of Fig. 1; Fig. 5, a section of the parts shown on the lower parts of Fig. 3 with the operating parts in a slightly differing position; Fig. 6, a section on line 6 6 of Fig. 1; and Fig. 7, a view similar to Fig. 6, showing the parts in a different position.

In the drawings, 10 indicates a suitable main frame, which carries two series of rollers or other suitable bearings 11 11, upon which is journaled two mold-carrying rings 12 12. The rings 12 12 are connected by a plurality of mold-carrying arms 13, each of which is provided with a plurality of brick-mold openings 14, which extend radially therethrough. Also mounted in rings 12 and extending therebetween is a plurality of bottom bars 15, each of which is radially movable in the rings and each of which is provided with a plurality of presser-blocks 16, which fit the molds 14. The cross-bars are held frictionally in any desired position by means of suitable springs 17, which engage the ends thereof. Vertically movable in the frame are two slides 18 18, one of which is arranged at each side of the machine and each of which is provided at its upper end with a finger 19, adapted to be brought into engagement with any one of the cross-bars 15 when said bars are successively brought into adjacency therewith. Arranged between the rings 12 12, beneath the cross-bar at the lower side thereof, is a discharger-bar 20, which has oppositely-extending arms 21 21, projecting through rings 12 and into slides 18, the said bars being arranged to be brought into engagement with the cross-bars 15 successively in order to discharge the formed brick, as clearly shown in Fig. 3. Arranged above rings 12 is a hopper 22, provided with as many orifices in its bottom as there are brick-molds 14 in each of the bars 13. These orifices are of substantially the same size at their bottoms as the brick-molds, and arranged above each of said orifices is a core-chute 23, the internal dimensions of which are a trifle less than the dimensions of the molds, and suitable hoppers 24 lead to said chutes. Sleeved upon each of the chutes 23 is a telescopic portion 25, which may be projected downward to or very close to the bottoms of the hopper 22 for a purpose which will appear. Leading to a hopper 22 is a suitable endless supply-belt 26, and leading to hoppers 24 is a similar belt 27. It is essential that the cement in the molds be subjected to a certain pressure in order to properly compact the material, and this compressing is produced by the use of a floating pressure-frame, which is not directly connected to the main frame and the construction of which is such that the compression force is not exerted upon the main frame or upon the rings 12. This is accomplished in the following manner. A frame composed of the pressure-bar 28, bottom bar 29, and connecting tie-bars 30 lies upon the frame in position to be opposite the mold-bar first past the filling position. The tie-bars 30 are arranged in pairs, and between each pair I arrange a toggle-lever 31, the lower member of which is pivoted to the lower cross-bar 29, while the upper member of which is pivoted to the inner compression member 32, which lies between the rings 12 and has ends projecting through said rings. Each toggle-lever is connected by a suitable pitman 33 with a crank 34, carried by a suitable driving-gear 35, the two gears meshing with a pinion 36, carried by the main drive-shaft 37. Shaft 37 is provided with a pinion 38, which meshes with a properly-timed gear 39, carried by a shaft 40, and said shaft is provided with a pair of eccentrics 41, which are connected by suitable straps 42 each with a lever 43. Each of the slides 18 is connected at its lower end to one of these levers 43, and thus is given motion by the eccentrics. Arranged adjacent the second mold position past the filling position—*i. e.*, the first mold position past the compressing position—is a supply-chute 44, which at its inner end is provided with light bottom-retaining springs 45. The chute 44 is adapted to receive a plurality of brick-boards 46, which are constantly urged toward the rings 12 by any suitable means, such as the spring 47. Each of the cross-bars 13 is provided at its opposite ends with a pair of pins 48, which engage the nearest brick-board 46 and carry the same downward out of chute 44, adjacent the mold. Each of the successively-discharged brick-boards is held in position against the outer ends of the molds by suitable tracks 49, which lead down to the lowest position of the molds and to a pair of vertically-movable tracks 50, each of which is slidably mounted upon the adjacent slide 18. Each of these tracks 50 is supported normally in its upper position by means of spring 51; but each of said tracks is provided with an arm 52, which may be engaged by a cam 53, carried by the adjacent eccentric 41, so that said tracks may be depressed to alinement with suitable receiving-tracks 54. In order to discharge the brick-boards from track 50, I provide a shaft 55, which carries a pair of upwardly-extending arms 56, adapted to engage the brick-boards and shove them from tracks 50 onto tracks 54. These arms 56 may be operated in any suitable manner—as, for instance, by means of the pin 57, carried by gear 39 and engaging a suitably-shaped arm 58, secured to shaft 55. The mold-carrying heads formed by the rings 12 and cross-bars 13 may be advanced step by step by any suitable means—such, for instance, as a ratchet-pawl 60, which is connected by a slotted link 61 to pin 57. A cut-off 62 is arranged to automatically close the bottoms of hopper 22 at suitable times, said cut-off being shown in the drawings as being connected to bar 28.

In operation the core-forming material is placed upon belt 27 and by it discharged into the core-forming chutes 23, and when the machine is first started the sleeves 25 are shoved down, so as to extend said chutes almost to the molds. The core-forming material is preferably somewhat more moist than is necessary for the proper mixture for cement; but it sets partially as it passes downward through chutes 23 and extends through the discharge sides of the hopper 22. The veneer-forming material is placed upon belt 26 and by it discharged into hopper 22. This material is preferably lacking in moisture, and as it is discharged into hopper 22 it flows down and sticks to the sides of the core passing from chutes 23, and the whole mass flows into the molds 14 therebeneath, the bottoms 16 of said mold having been withdrawn downward by the downward movement of slides 18. Continued rotation of the driving-shaft rotates the crank 34, so as to throw the top of levers 31 to the position shown in Fig. 7, the cross-bar 28 moving outward and the pressure-bar 32 moving inward and the cut-off plate 62 being drawn across the orifices of hopper 22, so as to cut off the flow of cement. Thereupon the rings 12 are advanced a step, so as to bring the recently-filled mold in line with the pressure members 28 and 32. Thereupon the toggles 31 are straightened, and the projections 28' of cross-bar 28 are brought into the outer ends of molds 14, while the pressure member 32 comes into engagement with adjacent cross-bar 15 and forces its blocks 16 toward the projections 28', the bricks in the mold being thus equally compressed from both ends, so that there is no danger of the bridging of cement within the mold. In the meantime the next set of molds has been filled from the hoppers, and another advancement of rings 12 brings the compressed bricks opposite the chute 44, and a brick-board is picked therefrom in the manner already described. As the heads are advanced step by step the first-filled mold comes to the position shown at the bottom of Fig. 2, and as the bricks in the last-filled mold are being compressed in the manner already described the downward movement of slides 18 brings the cross-bar 20 into engagement with the adjacent cross-bar 15 and forces said cross-bar downward to the position shown in Fig. 3, where the bricks are entirely discharged from the molds. In this position, however, the tops of the bricks are still in engagement with the portions 16 of the bar 15, and in order to retract them properly the cams 53 come into engagement with the arms 52 of the tracks 50 and draw said tracks downwardly, thus pulling said bricks away from the portions 16 and bringing tracks 50 into alinement with tracks 54, this movement being permitted by a compression of springs 51. Thereupon arms 56 swing so as to slide the brick-board, together with the finished bricks thereon, over upon track 54, from whence they may be readily removed either by hand or by any desired mechanism.

I claim as my invention—

1. In a brick-making machine, the combination of a pair of annular heads, a plurality of mold-bars connecting the same and having open-ended molds formed radially therein, of a radially-movable bottom bar arranged adjacent each mold-bar and provided with projections projecting into the inner ends of the molds, means for advancing the heads step by step, a pressure-frame consisting of an outer pressure-bar adapted to enter the outer ends of the molds, and an inner pressure-bar adapted to engage the bottom bars for moving both the outer pressure-bar and the bottom bar with relation to the mold, a receiving-board chute, means for associating a receiving-board with each filled mold, a pair of receiving-tracks 50, means for engaging the bottom boards and projecting the same radially outward to discharge the finished bricks from the molds, means for further retracting the tracks 50 so as to retract the finished bricks from the bottom boards, and means for discharging the brick-carrying boards from the machine.

2. In a brick-making machine, the combination, with a mold and means for compressing the material therein, of a hopper for containing veneer material, a discharge-spout leading from said veneer-hopper and of a cross-section substantially equal to the desired cross-section of the brick, a core-forming chute extending into said hopper to a point near the receiving end of the discharge-spout thereof whereby a core may be formed in said chute and passed from the discharge end thereof through the veneering material into the mold.

3. In a brick-making machine, the combination of a pair of annular heads, a plurality of mold-bars connecting the same and having open-ended molds formed radially therein, of means for compressing material within said molds, means for retaining a pallet or receiving-board adjacent said molds, a pair of receiving-tracks 50, means for forcing the formed brick from the mold onto the pallet and the pallet onto the tracks, means for further retracting the tracks 50 so as to retract the finished bricks from the expelling means, and means for discharging the pallets from the machine.

In witness whereof I have hereunto set my hand and seal, at Indianapolis, Indiana, this 7th day of October, A. D. 1903.

ORA STALEY. [L. S.]

Witnesses:
ARTHUR M. HOOD,
JAMES A. WALSH.